Oct. 4, 1932.  F. PLONER  1,880,476

APPARATUS FOR CASTING HOROSCOPES

Filed Aug. 1, 1927   2 Sheets-Sheet 1

Inventor:
Friedrich Ploner
by Attorney.

Patented Oct. 4, 1932

1,880,476

UNITED STATES PATENT OFFICE

FRIEDRICH PLONER, OF INNSBRUCK, AUSTRIA

APPARATUS FOR CASTING HOROSCOPES

Application filed August 1, 1927, Serial No. 209,873, and in Austria September 12, 1926.

This invention relates to an apparatus for casting horoscopes, i. e. to an apparatus by means of which the position of the sun, moon and planets can be ascertained and read for any place and for any desired date.

To cast a horoscope it is necessary to know the year, the month and the day, the hour of the day in local time or in standard time, and the degrees of longitude and of latitude of the place, which determine the horoscope. The invention solves graphically the problem how to cast from the data given a complete horoscope without the necessity of doing one single calculation.

The apparatus according to the invention comprises two tables and a transparent aspect chart, the one table containing in graphical representation the ephemeris of a section of a year or of a section of a half year as substituted for the commonly used figure-ephemeris, the other containing the tables of houses for the several degrees of latitude as substitute for the commonly used tables of houses in graphic representation. The two tables, of which at least one is made of transparent material, are to be laid the one on the other and in dependence on an hour-scale marked on one of the charts. A certain line gives then the complete horoscope. According to the invention the transparent aspect-chart is further provided with the division in days and designed to be placed on the two tables for reading the aspect of the adjusted horoscope.

An embodiment of the invention is illustrated, by way of example, in the accompanying drawings in which:—

Figure 1:
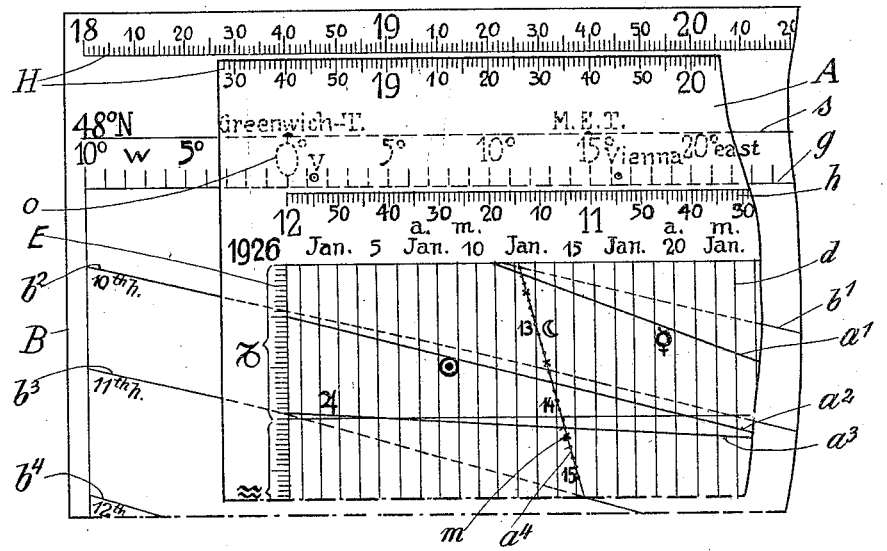
Fig. 1 shows a portion of the ephemeris-table for one year, placed on a portion of the table of houses.

On both Tables A and B all the diagrams are representations in the right angled coordinate system, according to a vertical scale E and to horizontal scales H, the first one with a uniform ecliptic division corresponding to the twelve zodiacal signs, each at 30 degrees, the latter with a uniform hour-minute division as for example 18 hours 10 minutes, 18 hours 20 minutes, 18 hours 30 minutes, 18 hours 40 minutes, 18 hours 50 minutes, 19 hours and so forth, which represents the sidereal time.

For constructing the ephemeris-table A the points of the sidereal-time values are ascertained on the horizontal-scale $h$, which correspond to the several days of the month of the year in question for the average noon in Greenwich. These sidereal-times are to be found in the well known ephemeris-tables. For the year 1926, selected in the example shown on the drawings, the following star time indications, selected to the average noon of Greenwich, are to be found for the 1st of January; the star time $8^{53}$, for the 3rd of January $18^{49}$, for the 4th of January $18^{53}$ and so forth. On the hour scale H of the table A these times or scale lines are traced and fixed.

Figure 2:
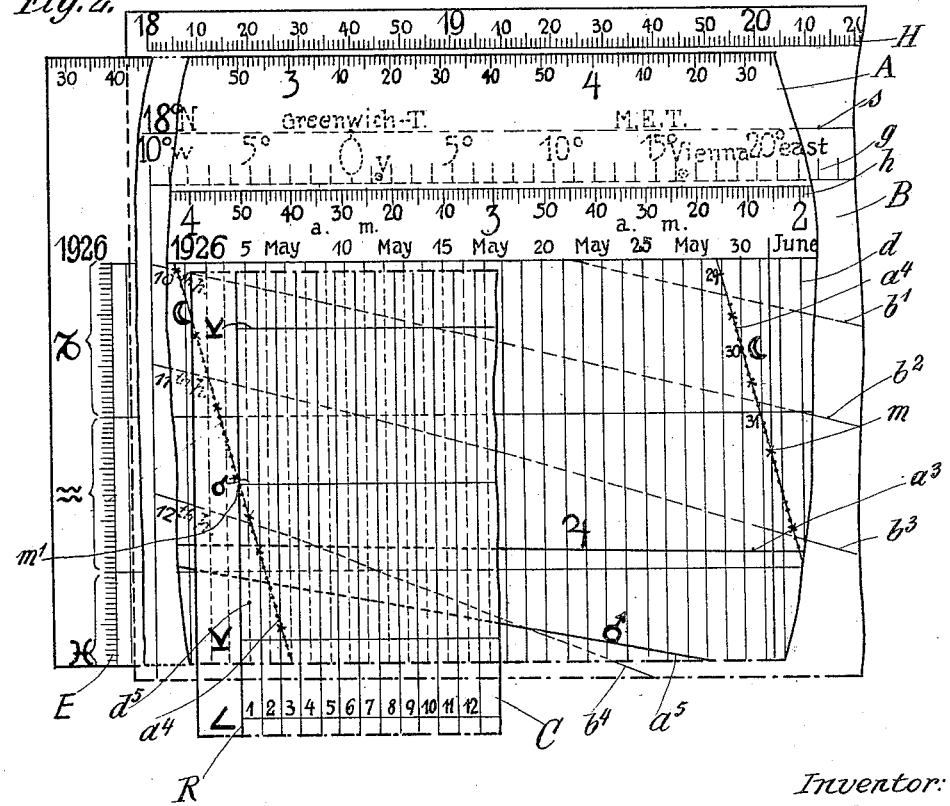
Fig. 2 shows a portion of the table of houses of the ephemeris table and of the aspect table placed the one on the other.

The parallel lines or ordinates through the points give the scale-lines $d$, which on the table are marked on such small scale that the distance from one division line $d$ to the other corresponds to the distance of 24 hour division lines on the Table B, and represent the days of the month of the corresponding year i. e. the noon-lines of the same. These noon-lines $d$ form, together with the horizontal lines according to the vertical scale E, the coordinate system into which are inscribed the longitudes of the planets, which can also be found in the commonly used ephemeris-tables. The points on the noon-lines found thus for each planet and marked on said noon-lines, are connected successively so that curves $a^1$, $a^2$ ... and so forth are obtained, which represent the movement of the planets on the ecliptic within a year or six months depending on whether apparatus of greater or less scope be used. In Figs. 1 and 2 portions of curves of the courses of Mercurius ($a^1$), sun ($a^2$), Jupiter ($a^3$) and moon ($a^4$), in Fig. 3 the courses of the sun and of the moon are drawn. For one intermediate division from one noon-line $d$ to the other, the moon-curve is used as division line and the hour division for one day $m$ is obtained, which represents the hours of the day in the hour time. In Figs. 1 and 2 the curve portion of the moon-curve from one noon-line to the following is subdivided by dots into eight equal portions, of which each corresponds to a distance of three hours of the course of the moon. The noon-line itself shows the position of the moon at noon, the first division-dot after the noon-line indicates the position of the moon at 3 P. M., the next following division-line at 6 P. M. and so forth. The times are Greenwich-time.

At the construction of the table of houses B the cups of the houses are inserted according to the vertical scale E and to the horizontal scale H' on Table B, said cups being found in the commonly used tables of houses, in that it is indicated which point of the ecliptic with regard to the zodiacal signs is just rising on the horizon at any determined place or longitudinal degree at any sidereal time, and is just progressing from 30° to 30° on the ecliptic. These points are traced on the scale E, which represents the ecliptic. On the scale H' on Table B which represents the sidereal time are produced the curves for the 12 house cusps $b'$, $b^2$ . . . and so forth. The first house is therefore the portion of the ecliptic from the rising point to 30° altitude, the second house the ecliptic from 30° to 60° altitude and so forth. The house cusps are the starting points of these houses. In Figs. 1 and 2 curved portions of the 9th, 10th, 11th and 12th house are shown, Fig. 4 giving a complete view.

The two tables are placed the one on the other, at least one of the same being of transparent material.

Preferably both tables are transparent so that heliographs can be made after adjusting and the horoscope can be set. The adjusting of the two tables, the one with regard to the other, is done with the aid of a scale $h$ on the Table A and by a mark "0" (zero). This zero mark is the starting point of a scale $g$ on the Table B and will be hereinafter described. The mark 0 is also the starting point for the scale $h$, which represents, with regard to the mark 0, the local time. The starting point 12 means noon. The scale $h$ is constructed according to the scale H' parallel and congruent with the same, but oppositely directed, i. e. with inverse succession of Figures: 12, 11, 10 and so forth. The mark 0 having been selected on Table A and the scale $h$ on the Table B lies in the same direction as the scale H. By horizontal displacement of the two tables, the one with regard to the other, the mark 0 can be adjusted on any single division line of the scale $h$. The diagrams of the two tables placed the one on the other form in any adjusting a unit, so that for instance all points of Table A, which come to lie on the curve of the 10th house of Table B, are to be considered as situated on the cusp of the 10th house, i. e. at the centre of the firmament.

The horoscope to be cast is obtained in the following manner: Take the graphic ephemeris (Table A), for the given year (for instance 1926), take further, the graphic table of houses, Table B, for the given geographic latitude, for instance for 48 degrees, and adjust the two tables with the mark 0 upon a point of the scale $h$ which corresponds to the time of day, which represents the local time at the given time of the day for instance $3^{28}$ A. M. (Fig. 2). This is the only adjusting which is necessary. After the adjusting, the tables are held together, for instance by a clamp. Look in the combined diagram for the given day of the month, for instance the 5th of May (Fig. 2). Ascertain starting from the noon-line $d5$ of this day, on the moon-scale $m^1$ the point, which represents the given day time which represents Greenwich-time, this being $2^{22}$ A. M. for the example given, and the corresponding point of the moon-scale will be found laying between the 3rd and the 4th division-line before the noon-line $d5$. The vertical line through this point, formed by means of a ruler or by the first vertical line R of a transparent aspect-chart C (Fig. 2) placed on the two tables, intersects all planet-curves and house-cusp curves. When these points of intersection are horizontally projected on the scale E, this scale E indicates in which zodiacal sign these points of intersection are situated and the degree in this zodiacal sign. These indications represent the desired horoscope which must then still be interpreted. It has been described above that the zodiacal signs on scale E comprise each 30° of the ecliptic. The degree lines are really drawn horizontally through the whole table, however only indicated on the scale E for clearness sake. The projection lines from the points of intersection of the line R with the planet curves and house-cusp curves onto the scale E are therefore made without the aid of a rule. For the dates mentioned of the example the results are as follows: The noon line $d5$ of May 5th 1926 intersects the moon curve $a^4$ on the division line for 12 o'cl. The given time is $2^{22}$ A. M. This time is situated on the moon curve $a^4$ about 10 hours back from the point of intersection with the noon line $d^5$, i. e. slightly more than three division lines, as one division line on the moon curve represents three hours. The line R of the aspect-chart must therefore be adjusted to the left slightly more than three division lines from the point of intersection of the noon line $d^5$ with the moon curve $a^4$, and it then intersects the moon curve in the point $m'$, which corresponds to the time $2^{22}$ A. M. of May 5th 1926. When this point of intersection of the line R of the aspect-chart is projected onto the scale E, the result is 13, accurately 13¼, degree in Aquarius. The point of intersection of the line R of the aspect-chart with the curve $b^2$ of the 10th house is situated on the 4th degree in the zodiacal sign of Capricorn. The cusp of the 10th house is therefore 4 degrees in Capricorn. The cusp of the 11th house is 24 degrees in Capricorn, the cusp of the 12th house is 21 degrees in Aquarius, Jupiter is 24½ degrees in Aquarius and so forth. This is however not a horoscope in the usual form of a circle, but a strip-horoscope, i. e. the circle is cut open at one point (in the example at 0 degree Capricorn) and developed.

The graphic converting of the local time into Greenwich time and generally the calculation of all relations between local time, Greenwich-time and any standard time for example European time, in which the hour of the day may have been given, and also between local time and the geopraphical longitude, is effected by the scale $g$ on the Table B. This scale represents the geographical longitude degrees by a horizontal scale, which indicates by representation in degrees (4 minutes=1 degree) the times on the scale $h$, and the zero-point of which, as already mentioned, is identical with the mark 0. When on this mark 0 of the scale $g$ the hour of the day in local time is adjusted by means of the scale $h$, there will stand under the division line of the scale $g$, which indicates the geographical longitude of the given place, always the Greenwich-time which corresponds to the given and adjusted local-time-hour of the day. For instance $3^h\ 28^n$ of scale $h$ is adjusted on the mark 0 of the scale $g$. Under the division line of 16 degrees 23 minutes east of Greenwich will be standing the division line $2^{22}$ A. M. of the scale $h$. This is the corresponding Greenwich time for the place in question (Vienna) (see Fig. 2). At the same time adjusting the hour of the day in standard time can be read under a point of the scale $g$, which point is distant to the east or west from the mark 0 as far as the town is distant from the corresponding time-meridian. For Vienna for instance this point is the point V, and the standard time is, for the adjusting shown, $3^{22}$ A. M. middle European-time. The distances of the time-meridians from Greenwich can be found on the scale $s$. The latter has originated from scale $g$: Greenwich is 0, 15 degrees east from Greenwich is central European-time, and so forth.

The total arrangement may be completed by an aspect-chart C which comprises a vertical division for the aspects. The aspect-chart is characterized by the fact that it comprises also a horizontal division in days, constructed after the noon-lines $d$. When the first vertical-line R is the desired horoscope, the vertical-line 2 is the horoscope for the following day, based upon the same time of the day, the vertical-line 3 is the horoscope for the 3rd day and so forth. This is of greatest importance for interpretation, as progressively one day means one year i. e. the horoscope for the next following day corresponds to that for the following year. With the aid of this aspect chart it is therefore not only possible to read the aspects, which any point of the birthday-horoscope forms with the other points of the birthday-horoscope for the following month, but also with the progressing of the positions of the planets on the ecliptic and cusps of the houses for the following day. The aspect-chart is transparent, and it must be displaced only in a vertical direction, when it has been once adjusted to the vertical line No. 1 ($r$) upon the horoscope section. In Fig. 2 the aspect-chart has been adjusted at "conjunction" onto the position of the moon of the horoscopic example. This means that the starting line, designated by a circle with an inclined line on top, which on the aspect-chart C in Fig. 2 is the middle transverse line, is adjusted to the given time 2—2 A. M. of May 5th on the moon curve $a^4$. The second aspect is represented by the transverse line of the aspect-chart designated by $v$. This aspect is called semisextil and it is distant 30 ecliptic degrees at either side of the starting aspect line. The different aspects are explained by the usual signs on the aspect lines known from astrology, and they are accordingly marked on the drawing. Other transverse lines, falling on the aspect-chart at the distance of 30 ecliptic degrees, indicate further aspects, which are of interest for the interpretation of the horoscope. The ecliptic degrees are marked on the scale E.

Figure 3:
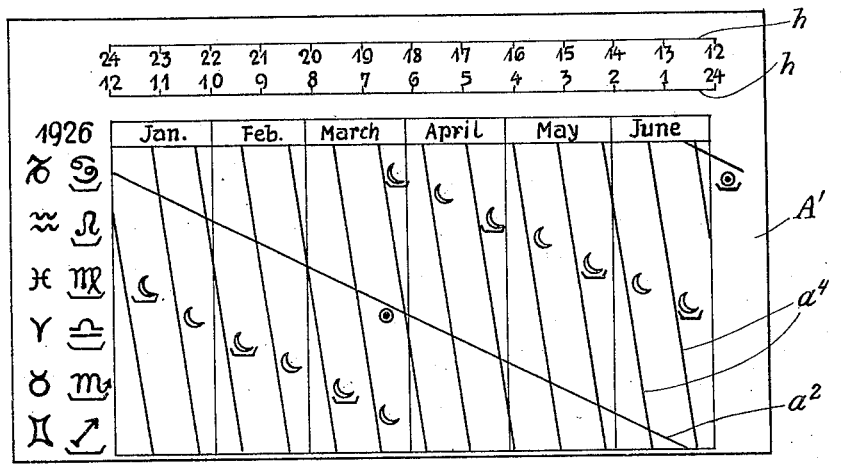
Figs. 3 and 4 show another form of construction of the ephemeris table and of the table of houses respectively.
Figure 4:
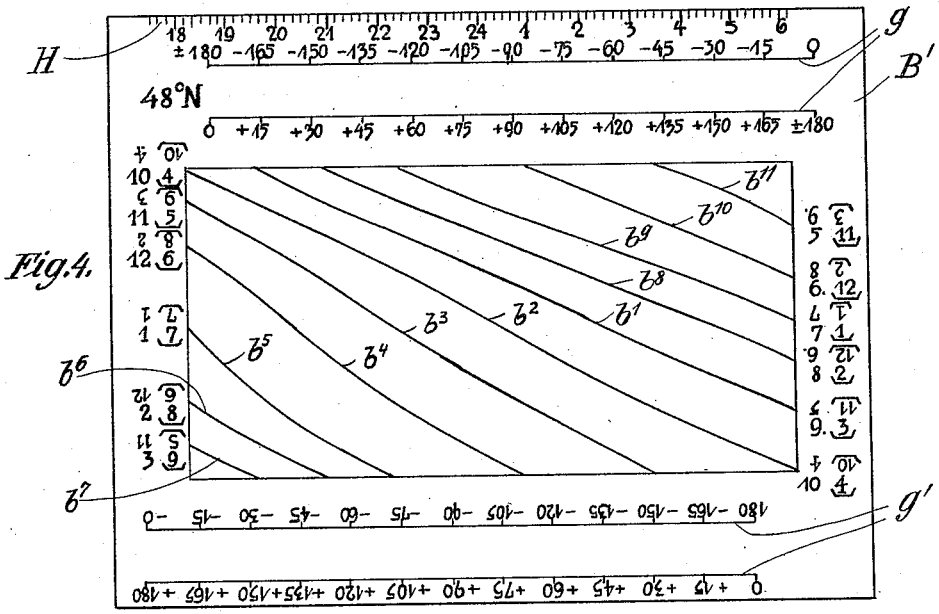

For increasing accuracy of reading the Table A may be divided into equal groups, for instance in two table-halves, each with six zodiacal signs, the second half of the table with the 7th to 12th zodiacal signs being drawn on the first half so that only one combined Table A' is produced. The Table B can be subdivided in a similar manner into two according halves, so that only one Table B' is produced (Fig. 4). The second halves of the house cusp curves register with the first halves so that it is not necessary to especially show the second halves, the second halves of the house-cusp curves extending from right to left, while the first halves extend from left to right. The corresponding of curve-portions and zodiacal signs of the two table halves may be made recognizable in any suitable manner, for instance by colors or, as shown in Fig. 3, by underlining. When for instance the designation for moon is underlined, the corresponding curve portion is situated in the underlined zodiacal signs. When the Table B' (Fig. 4) is placed on the Table A' the houses marked in the left margin of the Table B′ in the succession 10, 11, 12, 1, 2, 3 from above to below correspond to the not underlined zodiacal signs from above to below in Table A′, and the underlined house numbers 4, 5, 6, 7, 8, 9 on the left margin of the Table B′ correspond to the underlined zodiacal signs on the margin of the Table A′ from the top downward. The Table B′ has, however, only an hour range of 12 hours, i. e. from 18 h., to 6 h. In order that the same table may be used also for the second 12 hours of the day, i. e. for the star-time from 6 to 18 h., it has merely to be rotated 180° in its plane. In order that then the house numbers are legible, they may be marked upside down in the position of the table shown in Fig. 4, so that from the top downward in the position of the table rotated 180° the house numbers can be read accurately and correspond with the zodiacal signs on the Table A′ as before. As, however, in the second 12 hours of the star time the houses are displaced 180° in the ecliptic, i. e. are situated in the third and fourth quadrants, the underlining has been changed for the house numbers standing upside down so that, after the rotation of the Table B′, the outer row of the house numbers of the left margin belongs to the inner row of the zodiacal signs on Table A′.

In order to increase the accuracy of the horizontal scales $g$ and $h$, they may be divided also into equal parts, which are represented in the position placed the one over the other. In Fig. 3 an ephemeris for the first half year is represented, in which the hour-division for the afternoon, 24, 23, 22 . . . to 12, has been laid over that of the forenoon 12, 11, 10 . . . to 24. Scale $g$ on Table B′ in Fig. 4 is accordingly subdivided into two parts with two 0-marks, of which the one ranges over the forenoon and the other over the afternoon when this table is laid onto Table A. The graduation of the scale $g$ has been made according to Greenwich,—is east—is west of Greenwich. The table of houses B relates only to a range of 12 hours, and a second table of houses would have to be constructed for the other 12 hours. In order to avoid this, a scale $g^1$ has been arranged on the lower margin of B′ made possible because of the symmetry of the ecliptic, the figures on this scale standing upside down. The scale $g^1$ is congruent with the scale $g$ and symmetrical to the same, with regard to a vertical line imagined through the point "star-time 18 hours" on scale H on the one hand and with regard to the horizontal bisecting line of the table on the other hand. When, therefore, at an adjusting with scale $g$, the given noon-line should remain uncovered, the Table B has simply to be turned 180° and the adjusting is then done with the scale $g^1$ which, by the turning, has been brought into the normal position.

For comfortably handling the several elements of the apparatus suitable means may be used. It consists, in its simplest arrangement, for instance of a thin plate of cardboard, metal or wood with edge-guides above and below, by means of which the plates A and B can be shifted the one parallel to the other, and is further provided with vertical guides for the aspect chart C, which has been placed on the same supports if desired convenient fixing-means being further provided. With this arrangement the Table A will be adjusted first on the reading-line 1 of the Table C, whereupon the Table B is adjusted according to the Table A. For smaller dimensions, pocket-size, the Table A is preferably of cardboard and the Table B is of film-band and shiftably folded over the Table A like a bandage. The ends of Table B are connected the one with the other on the back of Table A, preferably by means of a rubber-strip in order to obtain a certain resistance against displacement of the Table B. For adjusting, this Table B is shifted with the fingers and moves around the edges of the Table A. The Table C is also made of an endless film band and wound in transverse direction around the Tables A and B.

The apparatus serves principally for astrologic purposes, but it might be used by anyone to ascertain where the sun, the moon or a planet is standing with regard to the ecliptic or with regard to the horizon of the place of observation. With the aid of this apparatus the time of rising and setting of the zenith and nadir-positions of the sun, the moon and the planets can be ascertained.

I claim:—

1. An apparatus for casting horoscopes, comprising in combination a table containing the longitudes of the planets represented from the known ephemeris graphically as curve, in a right angular coordinate system said system comprising as abscissa an hour-division for the sidereal time and as ordinate an ecliptic division with the zodiacal signs each of 30 degrees, and a scale division for the days of the month, the moon curve with a division dividing the day scale into hour sections according to Greenwich, a scale with hour division for adjusting the given hour of the day, a second table comprising the cusps of the houses from the commonly used table of houses represented graphically in curves in the same coordinate system as the first mentioned table and bearing further a zero mark, the said first mentioned table being, in use, adjusted upon said mark with the given hour of the day of its hour division, the ordinate to the hour of the given day converted into Greenwich time showing the horoscope together with the planet curves and curves of the cusps of the houses, one of said tables being of transparent material and adapted to be placed on the other of said tables.

2. An apparatus as specified in claim 1 comprising in combination with the 0 mark on the first mentioned table, a scale starting from this 0 mark and representing the geographic longitude degrees from Greenwich for the graphical converting of the hour of the day into Greenwich time.

3. An apparatus as specified in claim 1 comprising in combination with the 0 mark on the first mentioned table, a scale starting from the 0 mark and representing the geographic longitude degrees from Greenwich for the graphical converting of the hour of the day into Greenwich time, a certain ordinate producing by its points of intersection with the planet curves and with the curves of the cusps of the houses the horoscope, a transparent aspect-chart having a division according to the days of the month and which, laid on said ordinate and being shifted along the same produces also the aspects of the progressive horoscope to the radix horoscope.

4. An apparatus as specified in claim 1 in which the zodiacal signs of the ecliptic scale are represented in similar groups the one laid over the other.

5. In an apparatus as specified in claim 1, on the two tables the horizontal scales for the hours of the day and for the geographical longitude degrees respectively being presented the one over the other and parallel the one to the other.

6. In an apparatus as specified in claim 1 the table of houses provided with a second scale symmetrical to the scale of the geographical degrees of longitude so that by turning said table 180° said second scale may also be used for adjusting.

In testimony whereof I affix my signature.

FRIEDRICH PLONER.